(12) United States Patent
Gunal

(10) Patent No.: US 8,208,134 B1
(45) Date of Patent: Jun. 26, 2012

(54) RAPID VISUAL FIBER OPTIC CABLE TESTER

(76) Inventor: Erkan Gunal, Centennial, CO (US)

( * ) Notice: Subject to any disclaimer, the term of this patent is extended or adjusted under 35 U.S.C. 154(b) by 233 days.

(21) Appl. No.: 12/561,636

(22) Filed: Sep. 17, 2009

(51) Int. Cl.
*G01N 21/00* (2006.01)
(52) U.S. Cl. .................................................. 356/73.1
(58) Field of Classification Search .................. 356/73.1
See application file for complete search history.

(56) References Cited

U.S. PATENT DOCUMENTS

| | | | |
|---|---|---|---|
| 3,663,822 A | 5/1972 | Uchida | |
| 3,884,585 A | 5/1975 | Lebduska | |
| 4,281,925 A * | 8/1981 | Forrest et al. | 356/73.1 |
| 4,595,265 A * | 6/1986 | Hodgson et al. | 359/383 |
| 4,834,486 A | 5/1989 | Walker | |
| 4,940,892 A | 7/1990 | Fisher et al. | |
| 5,196,899 A | 3/1993 | Serwatka | |
| 5,530,546 A | 6/1996 | Barringer et al. | |
| 5,570,176 A | 10/1996 | Noel | |
| 5,694,511 A | 12/1997 | Pimpinella et al. | |
| 5,712,942 A | 1/1998 | Jennings et al. | |
| 5,731,893 A | 3/1998 | Dominique | |
| 5,940,559 A | 8/1999 | Noll | |
| 5,960,130 A | 9/1999 | Pimpinella | |
| 6,094,261 A | 7/2000 | Contarino, Jr. | |
| 6,363,198 B1 | 3/2002 | Braga et al. | |
| 6,373,562 B1 | 4/2002 | Marsh et al. | |
| 6,388,741 B1 | 5/2002 | Beller | |
| 6,412,987 B1 | 7/2002 | Horwitz et al. | |
| 6,437,894 B1 | 8/2002 | Gilbert et al. | |
| 6,439,776 B1 | 8/2002 | Harrison et al. | |
| 6,466,366 B1 * | 10/2002 | Dominique | 359/379 |
| 6,496,641 B1 | 12/2002 | Mahony | |
| 6,522,804 B1 | 2/2003 | Mahony | |
| 6,539,147 B1 | 3/2003 | Mahony | |
| 6,721,482 B1 | 4/2004 | Glynn | |
| 6,764,221 B1 | 7/2004 | de Jong et al. | |
| 6,862,397 B2 | 3/2005 | Harres et al. | |
| 7,373,069 B2 | 5/2008 | Lazo | |

OTHER PUBLICATIONS

U.S. Appl. No. 60/798,372, filed May 5, 2006, Erkan T. Gunal.
U.S. Appl. No. 60/964,727, filed Aug. 14, 2007, Erkan T. Gunal.

* cited by examiner

*Primary Examiner* — Tarifur Chowdhury
*Assistant Examiner* — Tara S Pajoohi Gomez

(57) ABSTRACT

A rapid visual fiber optic cable tester for visually inspecting optical continuity and attenuation of multiple strand fiber optic cable connectors through an existing fiber optic adapter panel, comprising: an enclosure having a uniform visual light source in a visible spectrum wavelength range to provide a uniform visual light pattern on a transparent screen; an electrical power source for powering the uniform visual light source; a power button for controlling the electrical power source; whereby the rapid visual fiber optic cable tester is positioned toward the existing fiber optic adapter panel at one end of the multiple strand fiber optic cable without a direct contact with the connectors; while observing visually at the other end of the cable through existing fiber optic adapter panel for any difference in light intensity between each fiber optic strand; therefore visually detecting optical continuity and attenuation by light intensity levels instantly and rapidly.

6 Claims, 4 Drawing Sheets

RAPID VISUAL FIBER OPTIC CABLE TESTER

BACKGROUND

1. Field

This application relates to fiber optic cable testers in general, and more particularly visual continuity, attenuation and optical loss testers that are used to troubleshoot and inspect fiber optic cable installations.

2. Prior Art

Previously, there have been many solutions and techniques introduced to test optical fiber cables. Commonly used methods can be categorized as follows:

(a) OTDR (Optical Time Domain Reflectometer)

An OTDR is used to characterize optical power reflected along optical fibers with a graphical signature on a display screen. The OTDR has the capability to measure the length of the optical fiber and characterize the optical power loss between any two points along the optical fiber. This equipment is built with highly sophisticated and sensitive electronic components. The OTDR, which only requires access to one end of the optical fiber, sends pulses of light into an optical fiber and measures the strength of the power reflected to the instrument. The OTDR takes thousands of measurements and displays the average of the returned power levels on the screen as a characteristic trace. The trace forms a line with a negative slope from left to right.

OTDR is the most expensive field testing equipment for optical fiber cables. Furthermore, the equipment requires periodic factory calibration to keep up with industrial test standards. The persons who use the equipment also require a high level of technical training which is usually provided by the same manufacturer of this equipment. Another disadvantage is that OTDR only tests one strand at a time, which is very time consuming in high volume applications.

(b) Power Meter (Cable Analyzer, Certifying Tester)

This category offers optimum cost for field testing of optical fiber cables compared to the OTDR. The principle technique is using an optical transmitter (light source) at one end of the cable, and optical receiver (power meter) at the other end of the cable. This technique is also known as end-to-end attenuation testing. An attenuation tester measures the optical power loss between cable termination points. Acceptable loss values are established according to the link loss budget for the cable under test. A specific type of optical jumper patch cord is required between the permanent link (the optical cable under test) and the testers (transmitter and/or receiver). A reference value (field calibration) is required prior to testing. If the jumper cables are dirty, the reference value will be higher and the attenuation measurement will not be accurate. Furthermore, jumper cables must have the same core size as the optical fiber cable (permanent link) being tested. If the jumpers are disconnected or the equipment is turned off after the field calibration process, the reference value is no longer valid and the testers should be recalibrated. Before calibrating, the testers should be left on for 10 to 15 minutes to let the drivers stabilize. The testers should come to the temperature at which they will be used before calibrating, since driver output can change with temperature. If the testers have been sitting in a hot van in the summer, or overnight in the winter, this may take an hour or more. The testers should be recalibrated after any event that can affect the amount of light being injected into the optical fiber, including disconnecting, reconnecting, changing the jumper cables, or replacing the batteries, etc. Good batteries can also be important for accurate test results. As batteries get weaker, the voltage may drop, and some testers will begin to give erratic results before the testers stop operating completely. If the testers use disposable batteries, it is unlikely anyone will keep the track of when the batteries were replaced. To achieve the most accurate loss measurements during calibration and testing, a multimode launch cord is required and should be wrapped five times (non-overlapping) around the mandrel before calibration. The diameter of the mandrel is also an important factor. If a mandrel does not exist during the time of testing, the consistency of the test results will be suspicious.

Another disadvantage is that end-to-end loss measurement requires testing one or two strands at a time, which is very time consuming in high volume applications. Moreover, two trained technicians are required at each end of the cable being tested. The technicians often use wireless devices (e.g. mobile phones, radios) to communicate during a troubleshooting operation which can cause interference with the field test instruments during testing and report inaccurate test results.

(c) Visual Light Source

A visual light source is also called an optical fiber light emitting diode (LED) or optical flash light. It also is in the category of continuity testers which test and troubleshoot the linkage of optical fiber strands. By connecting an optical fiber flashlight to one end of an optical fiber strand and then looking at the other end, a technician can determine if there is a breakage in the strand when the light is not visible.

However, cleanliness is the biggest concern and mostly overlooked factor during troubleshooting. Every optical fiber testing practice dwells on cleanliness for good reason—poor cleanliness practices are the single greatest cause of problems in optical fiber testing and operation. Cleaning optical fiber connectors requires lint-free paper or 99% reagent grade isopropyl. Alcohol from a drugstore may look and smell the same and show isopropyl on the label, but it is often only 70% pure—plenty of room for impurities. The wipes must be lint-free and made for this type of work. If using canned air to blow adapters clean, it should be made specifically for this purpose—keyboard cleaners from an office supply store can have many impurities. To clean an optical fiber connector, the test technician should wipe the connector ferrule with an alcohol dampened wipe—the alcohol helps dissolve dirt that may be on the ferrule. After cleaning with the moist wipe, the ferrule must be polished with a clean dry wipe to remove the alcohol and dissolved dirt. If the ferrule is allowed to air dry without polishing, the dirt in the alcohol is redeposited on the ferrule. After cleaning, the technician should put a dust cap on the connector immediately. This prevents damage to the ferrule and helps reduce contamination.

There is dust in the air all the time, and the cleaning process itself may create a slight electrostatic charge on the connector that can attract dust out of the air. A capped connector should also be cleaned before plugging it in—the plastic in same caps can deposit contamination on a ferrule. The end face of a ferrule should never be touched during testing—even "clean" fingers will leave an oily coating on a ferrule. Dust covers should be kept on all adapters until immediately before a connector is to be inserted. If a technician receives a failing test result for one link, the fiber optic connector should not be plugged into another adapter for comparison without cleaning it first—contamination can easily be spread from one adapter port to another. It is especially important to keep the port in pre-terminated cassettes clean. Unlike traditional optical fiber cabinets that allow a technician to unplug a connector on the inside for cleaning, pre-terminated cassettes are generally factory sealed, making ports difficult to clean if contaminated. This is also true of the MPO ribbon connectors on the back of the cassettes—they are difficult to clean once they are contaminated. Some suppliers now offer an advancing-tape cleaner that can be inserted into an adapter or female connector, but they are not always completely successful.

Because of the above concerns, it is more affective and more economical to keep the fiber adapters and ports clean from the very beginning.

Issued U.S. Pat. No. 5,196,899—Serwatka, is a good example for the above concerns. Serwatka described an embodiment in his patent application that consists of multiple connector adapters or adaptive interfaces for a polarity of connector types to match or connect various fiber optic connectorized endings, and also a bare fiber to a light source. The adaptive interface comprises a wheel having a variety of fiber optic connectorized end fittings.

From the perspective of cleanliness and a micro sensitive nature of optical fiber testing standards, dust is easily carried each time a fiber optic connector is plugged and unplugged from an optical adapter (or connectorized end fitting). The dust can easily cause attenuation (optical loss) during operation. Since Serwatka's apparatus contains a mechanical wheel to match different connector endings (fiber optic adapters), the dust can be accumulated inside the apparatus and carried easily from one connector to another during the continuity test.

The other disadvantage with Serwatka's apparatus is that when the mechanical wheel is aligned with the light source, only two connector endings can be tested at a time. Therefore, having multiple connector adapters does not speed up the test if the cables being tested have the same type all over. In today's fiber optic installation best practices, only one type of connector and adapter is used for an entire site to provide user flexibility and ease of operation. Therefore, Serwatka's approach is not an ideal solution for rapid field testing in high volume of test conditions. Thus, because of the fragile nature of fiber optic strands, someone with no technical experience can easily break the fiber optic strand while using Serwatka's apparatus by exceeding the maximum allowed bend radius. The optimum solution should be not touching the permanent link (fiber optic linkage being tested) in the field.

Similarly, issued U.S. Pat. No. 7,373,069—Lazo claims at least two fixed adapters as a part of his tester. Therefore, his invention is also affected by the cleanliness concerns described above and potential fiber damage while plugging and unplugging the fiber optic connectors during the test.

Present application and described embodiment resolves all the problems associated with the above concerns.

(d) VFL (Visual Fault Locator), VFF (Visual Fault Finder)

A visual fault locator or finder operates in the visible laser light range. It's used to identify individual optical fibers within a cable by sending a red laser light down the optical fiber. When used as a troubleshooting tool, the optical fiber strand will glow red at the point of a break or separation of optical fibers. Units that pulse on/off are easier to use when looking for a break. These tools can also be used to detect a damaged optical fiber ferrule. If the ferrule is cracked or damaged, the entire ferrule will glow red during this test.

However, laser light sources can cause eye damage. A person should never look at optical fiber strands with a visible or invisible laser light source on.

The other problem with the VFL and VFF that they offer only testing on one connector or port at a time, which is time consuming. If the fiber optic strand is broken inside a thick fiber optic cable jacket, innerduct or conduit, the laser light will not be noticeable. These testers offer either a fixed adapter tip or interchangeable port for different types of fiber optic connectors. Therefore, dust is carried easily from one connector to another during field testing of optical fiber connectors.

(e) Strand Identifier

A clamp-on unit inserts a macrobend into the optical fiber cable and thereby is able to detect the light escaping from the optical fiber. This device is used to detect the presence of light, as well as transmit and receive direction on singlemode and multimode optical fiber cable.

However, because of creating a macrobend into the optical fiber strand being tested, this device can break the fiber easily if accidentally used on fragile hot spots. The test technician could never know which sections of the fiber cable might have fragile spots. Moreover, this tester is considerably costly to buy and operate.

(f) Fiber Optic Microscope

A hand-held or desktop microscope with different magnifying rates, such as 250×, 300×, 400× is a well known optical instrument to visually check the surface of a fiber optic core and cladding on terminated and polished fiber optic ferrules. The fiber optic microscope also comes with a fixed or interchangeable adapter interface where the fiber connector plugs in. Therefore, dust is easily carried from one connector to another during inspection. Furthermore, labor cost becomes high since only one strand or port can be inspected at a time.

As it can be clearly seen from all the disadvantages of the prior arts, presently there has been no solution offered to provide the following advantages of the present application:
(a) Rapid field testing,
(b) Dust free application,
(c) Visual light source for eye protection,
(d) No field or factory calibration is necessary,
(e) No certified or trained technicians are required,
(f) No patch cords or jumpers are needed,
(g) No receiving device at the opposite end of the cable is required,
(h) Multiple fiber connectors can be tested all at once,
(i) No contact with fiber optic cable strands; therefore no potential risk for fiber breakages,
(j) Low cost of manufacturing and ownership,
(k) Ease of use,
(l) Labor saving is maximized,
(m) Compatible with all existing fiber optic adapters and panels.

These and other advantages of one or more aspects will become apparent from a consideration of the ensuing description and accompanying drawings of the present application.

SUMMARY

In accordance with one embodiment, this application provides a quicker, simpler, safer and cleaner technique for visual continuity and attenuation testing of multiple strand optical fiber cables by trained and/or non technical persons, without fixed adaptive interfaces, couplers, adapters or specific patch cords as a part of the embodiment, thus offering a wider vendor free compatibility by using existing fiber optic adapter panels, couplers, and connectors in today's fiber optic cable installation standards for rapid field testing.

A rapid visual fiber optic cable tester is a mobile tester for visually inspecting optical continuity and attenuation of multiple strand fiber optic cable connectors through an existing fiber optic adapter panel, comprising: an enclosure having a uniform visual light source in a visible spectrum wavelength range to provide a uniform visual light pattern on a transparent screen; an electrical power source for powering the uniform visual light source; a power button for controlling the electrical power source; whereby the rapid visual fiber optic cable tester is positioned toward the existing fiber optic adapter panel at one end of the multiple strand fiber optic cable without a direct contact with the connectors; while observing visually at the other end of the cable through existing fiber optic adapter panel for any difference in light intensity between each fiber optic strand; therefore visually detecting optical continuity and attenuation by light intensity levels instantly.

DRAWINGS

Figure 5:
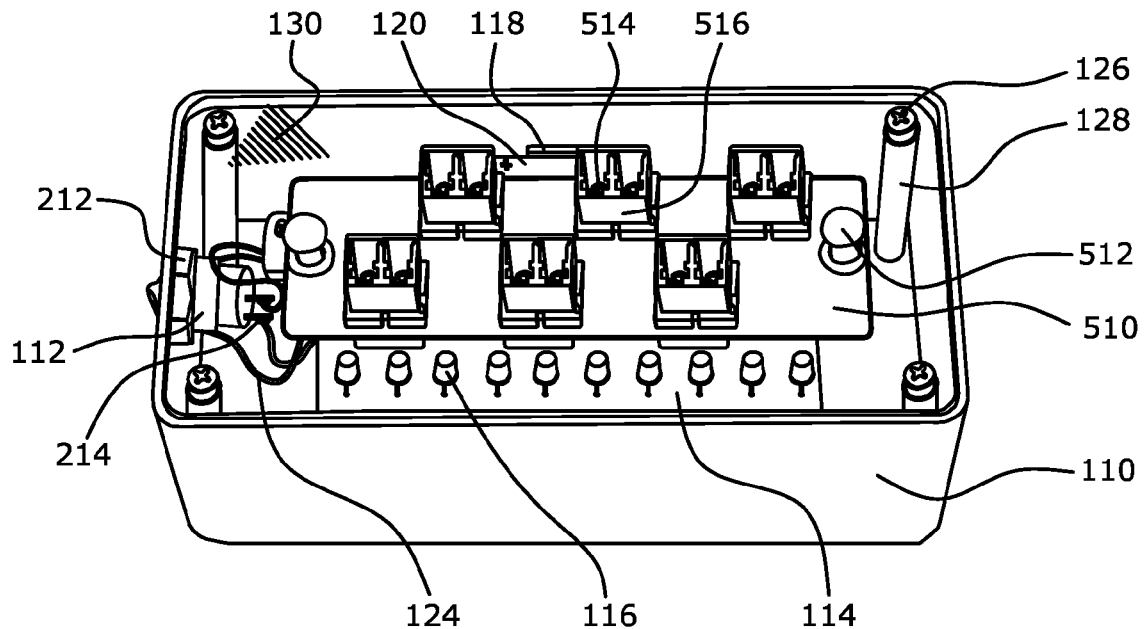
Figure 6:
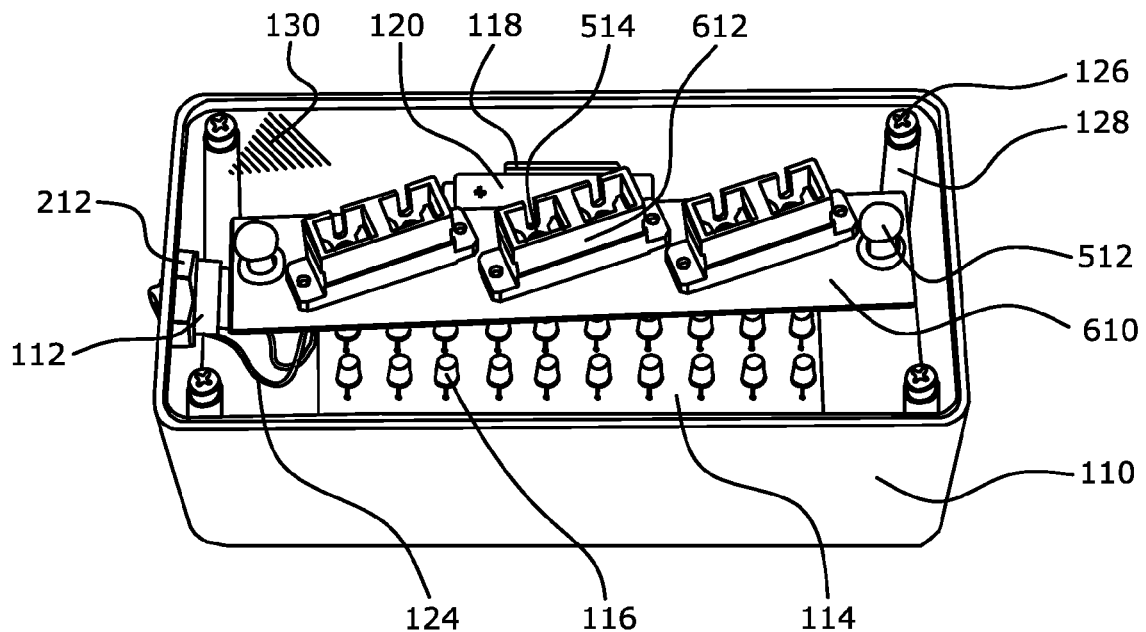
Figure 7:
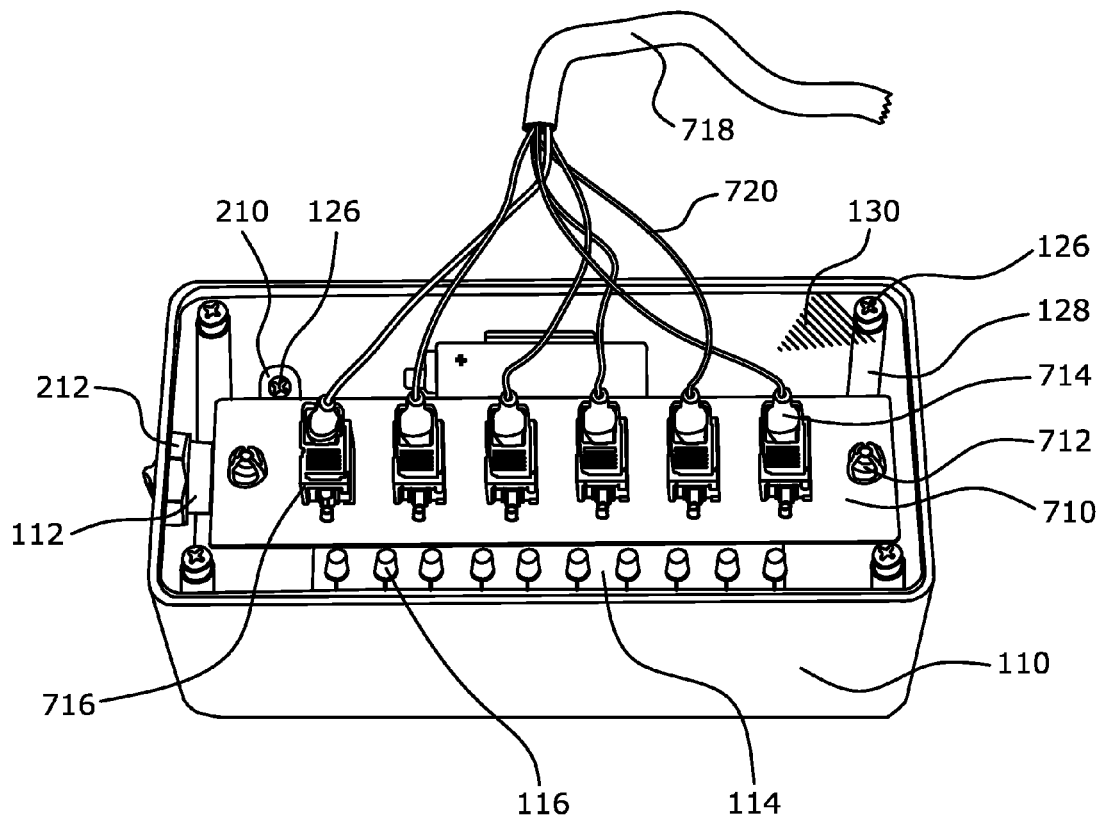

FIGS. 5, 6 and 7 demonstrate different types of existing fiber optic adapter panel applications that can be found in field installations.

Figure 8:
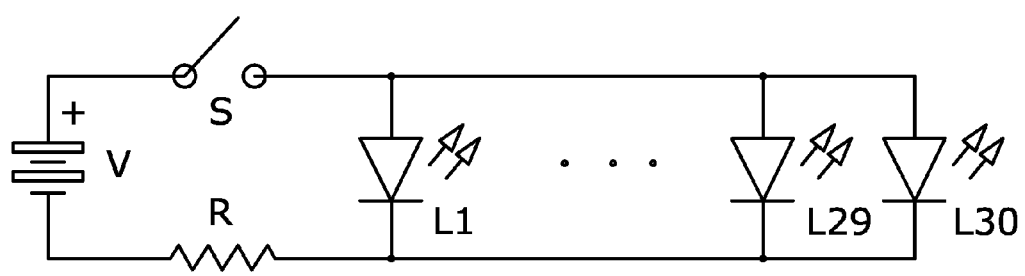

FIG. 8 shows a sample electronic circuit diagram of a visual light source inside the rapid visual fiber optic cable tester.

DRAWINGS - REFERENCE NUMERALS

| | |
|---|---|
| 110 | enclosure |
| 112 | power button |
| 114 | circuit board |
| 116 | LED |
| 118 | battery holder |
| 120 | battery |
| 122 | snap connector |
| 124 | wire |
| 126 | screw |
| 128 | support column |
| 130 | transparent screen |
| 210 | cable clamp |
| 212 | nut |
| 214 | terminal |
| 216 | resistor |
| 310 | foot |
| 510 | existing fiber optic adapter panel (LC duplex) |
| 512 | snap |
| 514 | hole |
| 516 | fiber optic adapter (LC duplex) |
| 610 | existing fiber optic adapter panel (SC duplex) |
| 612 | fiber optic adapter (SC duplex) |
| 710 | existing fiber optic adapter panel (SC simplex) |
| 712 | snap teeth |
| 714 | fiber optic connector (SC) |
| 716 | fiber optic adapter (SC simplex) |
| 718 | multiple strand fiber optic cable |
| 720 | single fiber optic strand |

DETAILED DESCRIPTION OF THE EMBODIMENT

Figure 1:
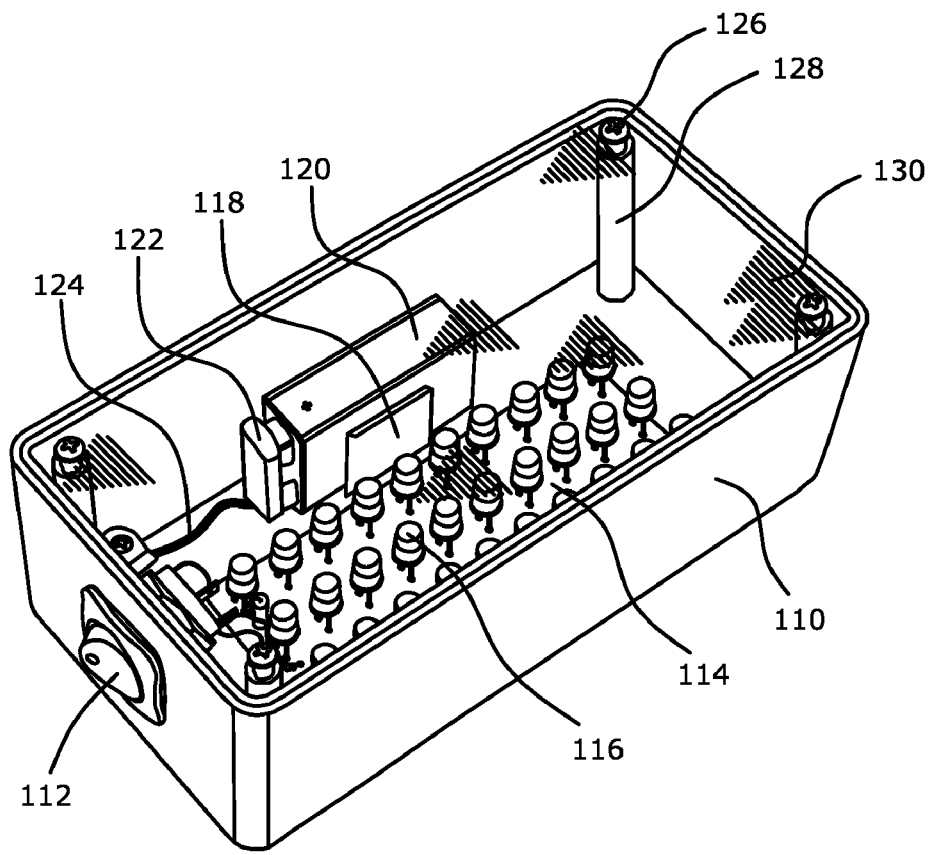
FIG. 1 shows a perspective view of the rapid visual fiber optic cable tester.

FIG. 1 shows a perspective view of the rapid visual fiber optic cable tester. Enclosure 110 holds all the components together. Power button 112 is positioned on the side wall of enclosure 110. Circuit board 114 is fixed inside enclosure 110. Each LED 116 (Light Emitting Diode) is mounted in a straight position on the circuit board 114. LEDs 116 are distributed uniformly on the circuit board 114 to provide a uniform visual light pattern through the surface of a transparent screen 130. A total of thirty high intensity LEDs are used to create a basic uniform visual light source in a visible spectrum wavelength range. However, in lieu of LEDs, other light sources can be used as well, such as fluorescent, neon tube, bulb, laser diode, etc. Therefore, there is no limitation for what type and color of light source is used, as long as it is visually sensible.

Transparent screen 130 in FIG. 1 is located above enclosure 110 and fastened from all corners with screws 126 on support columns 128. Even though transparent screen 130 is made of Plexiglas™, any semi-transparent or clear material, such as glass, plastic, rubber, polymers, vinyl, etc., can also be used.

Figure 2:
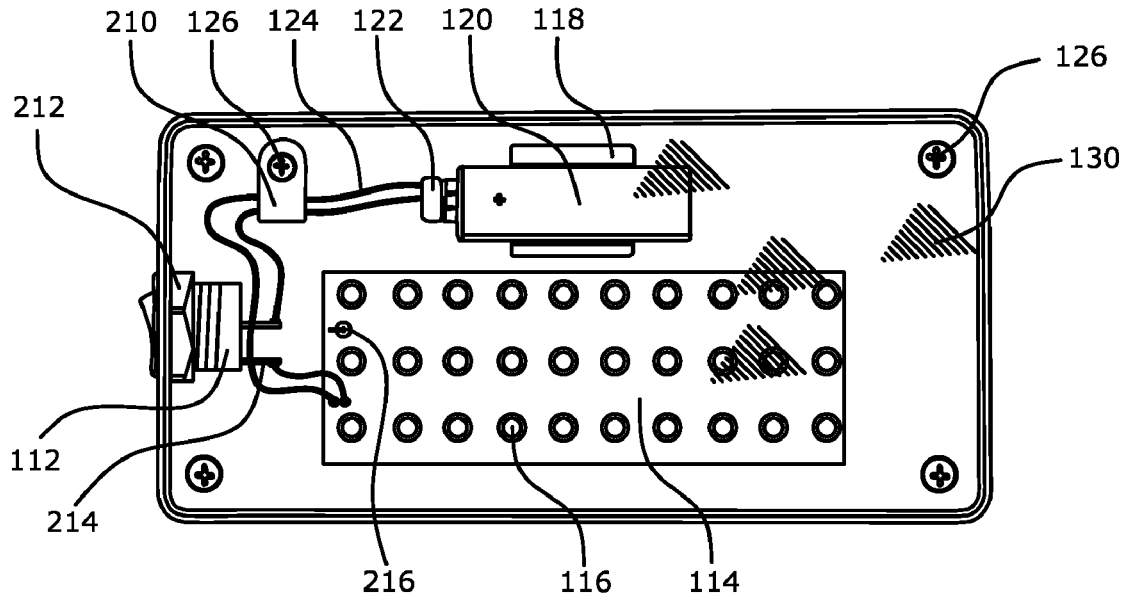
FIG. 2 shows top view of the embodiment with inside components.

FIG. 2 shows top view of the embodiment with inside components. Battery holder 118 is fixed adjacent to the circuit board 114, where resistor 216 and LEDs 116 are mounted. Battery 120 is securely grasped inside the battery holder 118. The battery 120 is a 9V battery; however it can be any type of electrical power source. Insulated wire 124 is terminated on a snap connector 122, while battery 120 is firmly attached to the snap connector 122 to provide electrical power for the visual light source. Since a 9V battery is used, other types of battery holders and snap connectors can also be used to provide adequate function. A cable clamp 210 is fastened with a screw 126 inside the enclosure 110. Electrical insulated wires 124 are grouped together inside the cable clamp 210. Power button 112 is fastened with a nut 212. Power button terminals 214 are attached to the wires 124 while connecting the circuit board 114 and the snap connector 122 together. Even though an insulated wiring is used between the power source, power button and the light source; other methods can also be used to eliminate insulated wiring, such as mounting all the components directly on a printed circuit board.

Figure 3:
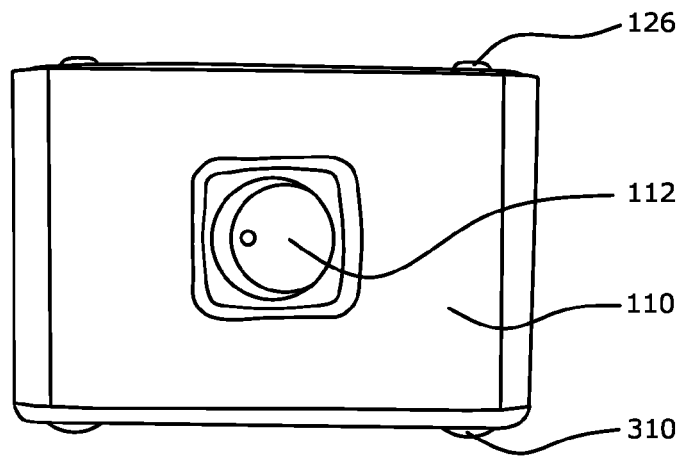
FIGS. 3 and 4 show side views of the embodiment.
Figure 4:
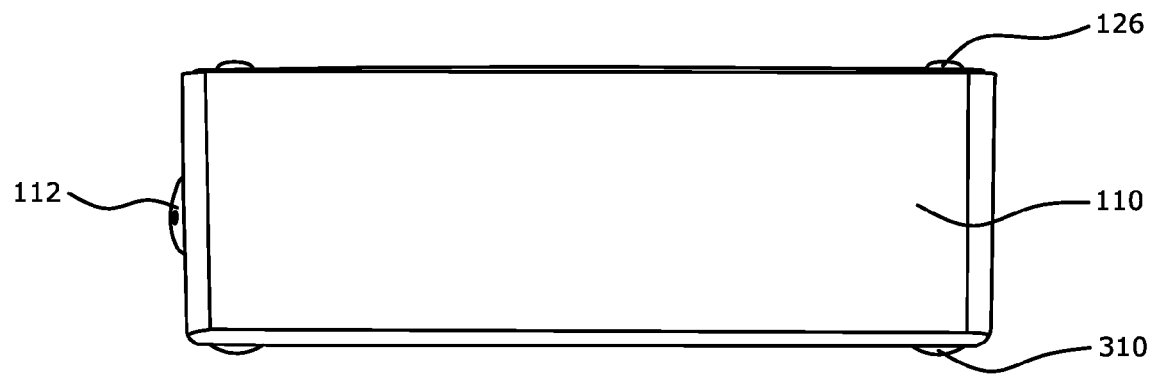

FIGS. 3 and 4 show side views of the embodiment. Foot 310 is provided as a part of the enclosure 110 on all four corners.

FIGS. 5, 6 and 7 demonstrate different types of existing fiber optic adapter panel applications that can be found in field installations. In FIG. 5, a standard existing fiber optic adapter panel (LC duplex) 510 is placed in a horizontal form on the transparent screen 130. Snaps 512 are not used to secure the existing fiber optic adapter panel 510 on the transparent screen 130, since it's free standing. The existing fiber optic adapter panel (LC duplex) 510 has multiple fiber optic adapters (LC duplex type) 516, and each consists of two holes 514.

Similarly in FIG. 6, another standard type and brand of existing fiber optic adapter panel (SC duplex) 610 is placed on the transparent screen 130 loosely. The border of the rectangular shape of the existing fiber optic adapter panel 610 is aligned with the circuit board 114, so that holes 514 can be positioned to match vertically with the visual light source.

In FIG. 7, a third different type of existing fiber optic adapter panel (SC simplex) 710 is illustrated. The existing fiber optic adapter panel 710 is positioned face down on the transparent screen 130 loosely. There are total of six fiber optic adapters (SC simplex) 716 in series on the existing fiber optic adapter panel 710. Snap teeth 712 are loose and not connected anywhere. SC type of fiber optic connectors 714 are plugged into the fiber optic adapters 716. Multiple strand fiber optic cable 718 consists of six single fiber optic strands 720. The opposite end of the fiber optic cable 718 is not shown in FIG. 7, however it is identical to the other end.

In FIG. 8, a sample electronic circuit diagram of a visual light source inside the visual fiber optic cable tester is provided. "V" represents the power source, which is 9V battery 120 as described above. "S" represents the power button 112. "L1" through "L30" are connected in parallel while representing the light source LED 116. "R" symbolizes the resistor 216 and connected in series to the circuit. The value of the resistor is 100 ohms. Since other visual light sources can be used, there shall be no limitation on electronic component types and values to provide a uniform visual light pattern on the transparent screen 130 in FIGS. 1 through 7.

There are many types of existing fiber optic adapter panels commercially available in today's telecommunications industry. The embodiment described above has the capability to work with any size, type and kind of existing fiber optic adapter panels regardless of the manufacturer. Therefore, the given existing fiber optic adapter panel examples in FIGS. 5, 6 and 7 should not limit the range of other applications for this embodiment.

The operation of the embodiment can be followed through FIGS. 2, 5, 6, and 7 as follows:

In FIG. 2, when the power button 112 is turned on, the battery 120 provides electrical current flow through the wires 124 and powers the circuit board 114 and lights up all the LEDs 116. The transparent screen 130 turns into an illuminated uniform visual light source strip.

In practice, when the user positions any given existing fiber optic adapter panel on or toward the transparent screen 130 as shown in FIG. 7, the visual light emitted from LEDs 116 will be guided through each corresponding fiber optic strand 720 along the fiber optic cable 718 and reach the opposite end of the cable. During the operation, the visual light will also be visible at the opposite end of the existing fiber optic adapter panel (not shown in the Figs.) Multiple fiber optic connectors will shine at the same time, while making it possible to visually inspect all fiber optic cable strands 720 at once for discontinuities or high attenuations. If the guided light in each strand is obstructed by any factor along the way, the visual light output intensity will be proportional with this factor, such as causing a dark or bright dot. The lack of light at the opposite end is the evidence of having a bad defective fiber optic termination, splice or breakage. The success of observing a bright light is the obvious evidence of having a good transmission throughout the fiber optic cable link. Looking at all the connectors from a distance at the same time provides a visual comparison to detect the differences between high and low attenuations.

As an alternative operation, the embodiment in FIGS. 5, 6 and 7 can be positioned directly toward an existing fiber optic adapter panel or connector from its original place in a short distance and flat angle without touching the transparent screen 130.

From the description above, a number of advantages of the embodiment of the rapid visual fiber optic cable tester become evident:

(a) Rapid inspection of multiple fiber optic cable strands with all connectors at once for defects becomes possible.

(b) Being compatible with any type or brand of existing fiber optic adapter panel, coupler or connector as described above. Therefore, this application provides a broader vendor-free fiber optic cable test solution.

(c) The transparent screen eliminates the need for having built-in multiple connector adapters, panels or adaptive interfaces as a part of this embodiment. Therefore, the fiber optic cable connectors under test do not need to be disconnected from their original existing fiber optic adapter panel. This way, dust is not carried between connectors, adapters and panels. Maximum cleanliness is preserved during the test.

(d) The use of fiber optic patch cords and pigtails are not required between the permanent fiber optic cable and the embodiment. Therefore, the ease of testing and universal compatibility is highly improved.

(e) Because of performing a visual inspection with bare eyes, no additional test device is required at the opposite end.

(f) Because of having no sensitive electronics involved, no field or factory calibration is required.

Accordingly, the user will see that the rapid visual fiber optic cable tester is economical, faster, safer, cleaner and easier to use when compared to current prior art testing methods. In addition, no higher level test technicians are required to perform a visual fiber inspection in the field. Since there is no need for changing or swapping individual fiber connectors, the core of the fiber is not exposed to dust or held by oily hands.

Furthermore, the visual fiber optic tester has other additional advantages in that:

There is no need to touch the bare fiber optic cable strands during the test, since the embodiment can be positioned directly onto an existing fiber optic adapter panel without moving the existing fiber optic adapter panel from its original place.

There is always a risk associated while handling bare fiber optic cable strands by inexperienced hands. If a person is not familiar with the fragile nature of fiber optics, during plugging and unplugging the connectors, the fiber optic strands can be easily broken by exceeding the maximum bend radius. This embodiment is a perfect solution for testing the fiber optic cable connectors by naive or inexperienced persons since this tester can be directly positioned toward the existing fiber optic adapter panel without a physical contact.

Compared to a single channel or pair testing method, this embodiment provides virtually infinite channels or pairs of test at a time. Therefore, the labor associated with this tester is considerably lower than the prior art methods.

This invention provides a rapid field testing of the same type of optical fiber connectors and existing fiber optic adapter panels in a high volume test condition.

Although the description above contains many specificities, these should not be construed as limiting the scope of the embodiment but as merely providing the illustrations of the presently described embodiment. For example, the enclosure can have other shapes, such as circular, oval, trapezoidal, triangular, etc.; the transparent screen can have other shapes, or even can hold fixed adapter panels or connectors as alternative; the light source can have more sophisticated electronics involved, such as sequential LED driver, flip-flop, adjustable illumination or intensity control, manual operation, joy stick, navigation buttons, automatic delay, switch control function, etc.

Thus the scope of the embodiment should be determined by the appended claims and their legal equivalents, rather than by the examples given.

What is claimed is:

1. An apparatus for inspecting an optical continuity and attenuation of a fiber optic adapter panel, wherein said fiber optic adapter panel comprises a plurality of fiber optic cable connectors, comprising:

an enclosure comprising a bottom panel, a top panel and four side panels;

a plurality of light sources located on an inside surface of said bottom panel of said enclosure, wherein said plurality of light sources are uniformly distributed across said inside surface and wherein said plurality of light sources emit light in a visible spectrum wavelength range;

a power button located on an outside surface of one of said side panels to control an electrical power source to power said plurality of light sources;

said top panel of said enclosure comprises a transparent screen, wherein said transparent screen is a planar surface that extends across the entire top panel, wherein said transparent screen has an inside surface facing the plurality of light sources and an outside surface to be coupled to said fiber optic adapter panel; and wherein said plurality of light sources emit light through said transparent screen to said fiber optic adapter panel to inspect the optical continuity and attenuation through said plurality of fiber optic cable connectors.

2. The apparatus according to claim 1, wherein said plurality of fiber optic cable connectors are positioned to align with said plurality of light sources.

3. The apparatus according to claim 1, wherein said plurality of light source are a plurality of light emitting diodes.

4. The apparatus according to claim 1, wherein said transparent screen comprises a semi-transparent material.

5. The apparatus according to claim 1, wherein said transparent screen is coupled to said fiber optic adapter panel but not in contact with said fiber optic adapter Panel.

6. The apparatus according to claim 1, wherein said planar surface of said transparent screen is universally compatible with a plurality of different types of fiber optic adapter panels.

* * * * *